United States Patent Office 3,432,254
Patented Mar. 11, 1969

3,432,254
CORROSION PREVENTION
Adrian J. MacNab, San Francisco, and Richard S. Treseder, Oakland, Calif., assignors to Shell Oil Company, New York, N.Y., a corporation of Delaware
No Drawing. Filed Oct. 5, 1964, Ser. No. 401,729
U.S. Cl. 21—2.5        6 Claims
Int. Cl. C23f 15/00

ABSTRACT OF THE DISCLOSURE

The corrosion of metals containing substantial amounts of nickel by molten mixtures of antimony halide and aluminum halide is significantly reduced by the addition of a small amount of aluminum metal to the molten mixture with the additional advantage that the catalytic properties of the molten mixture is enhanced by the addition of aluminum.

---

This invention relates to inhibition of corrosion of nickel-containing metal by the addition of elemental aluminum to systems comprising an aluminum halide-antimony halide catalyst.

The low-temperature isomerization of normal paraffins has been a popular commercial method of upgrading these feedstocks for over twenty years. One of the most common and effective isomerization systems employs a molten halide catalyst comprising aluminum and antimony halides, such as described in U.S. 2,370,195, to Ross, dated Feb. 27, 1945, and U.S. 2,387,868, to Anderson et al., dated Oct. 30, 1945. Early isomerization practice was generally limited to isomerization of normal butane, which is easily obtained as a relatively pure stream in a refinery. Recently, however, with the trend to higher octane, lower sensitivity gasoline, attention has been directed to the processing of somewhat heavier feeds, for example $C_5$ and $C_6$'s, which are desirable blending components for motor gasoline. Although the development of pentane and hexane isomerization has been hindered because of the large amounts of sludge formed, new processes for recovering valuable catalyst materials from the sludge have been developed. For example, a high-temperature process for hydrogenating aluminum chloride/hydrocarbon sludge in the presence of substantial amounts of antimony chloride is described in copending application Ser. No. 286,107, filed May 31, 1963 and now U.S. Patent No. 3,227,776.

One of the major expenses associated with processes catalyzed by mixtures of aluminum halide and antimony halide is directly attributable to the extreme corrosive nature of the mixture, especially when in the presence of a hydrogen halide promoter. Materials such as iron, copper, tin, lead and carbon steel are rapidly corroded and must be frequently replaced. Frequent shutdowns for inspection and repair of equipment are time-consuming and expensive. Furthermore, the presence of corrosion products in the system is extremely deleterious to catalyst activity. Extremely inert materials, such as Teflon and noble metals, are prohibitively expensive. Commercially, a suitable compromise such as lining the reactor vessel with Inconel or nickel is usually reached. These linings are only partially satisfactory, however, since inspection and repair of the vessel is necessary about every six months, and replacement of the lining is very costly. Although it has been found that corrosion can successfully be reduced by cathodic protection using an impressed current and an antimony anode such as is described in copending application MacNab et al., Ser. No. 233,084, filed Oct. 26, 1962 and now U.S. Patent No. 3,201,335, this method is sometimes undesirable for safety reasons. With the commercial advent of sludge regeneration, the corrosion problem has become more prominent since even nickel is rapidly corroded at the high-temperature regeneration conditions.

It has now been discovered that in a system containing a molten mixture of antimony halide and aluminum halide, corrosion of metals comprising substantial amounts of nickel can be substantially reduced by the addition of small amounts of aluminum metal to the liquid catalyst. This method of protection is effective because of the specific film-forming characteristics of nickel and nickel alloys, and depends on the essential presence of antimony halide. Furthermore, since the added aluminum metal is oxidized to trivalent aluminum ions, thereby dissolving in the salt mixture, this method of corrosion prevention actually also provided fresh catalyst to the system. Although the invention applies to any aluminum halide-antimony halide system, it will be described in terms of the chlorides.

Since to be effective the aluminum must dissolve in the melt, it is desirable, although not essential, to add the aluminum in a form having a high surface area, such as granules, turnings, pellets, or powder. Finely divided aluminum such as aluminum powder is preferred, since the small particles dissolve more rapidly and are less likely to settle at low levels to plug lines and valves. The metallic aluminum can be added to the catalyst in any manner; for example, powder can be fed directly to the catalyst continuously or intermittently, or it can be mixed with an oil or with hydrocarbon feed and fed to the appropriate vessel. Aluminum is preferably fed to a conversion reactor, e.g., an isomerizer, or to an aluminum halide regenerator, where a large amount of catalyst is present and mixing is effective. In general, it is acceptable to feed the aluminum to any part of the process because once in the system, the aluminum will travel with the liquid streams and will protect all parts of the system in contact with the catalyst.

Aluminum is desirably present in an amount sufficient to reduce corrosion in the system. Aluminum concentration required will vary with process conditions, e.g., temperature, aluminum halide and hydrogen halide concentrations, vessel surface area, etc.; suitable concentrations are usually between about 0.005 to about 2%, preferably 0.01 to 1% by weight of the aluminum chloride-antimony chloride mixture. Optimum amounts are usually about 0.1%. The aluminum is effective over a wide range of process conditions, including temperature ranges of from 0° F. up to 500° F. Commonly encountered process temperatures are from about 100° F. to 400° F. Typical reactor conditions for isomerizing $C_4$-$C_6$ hydrocarbons with a catalyst comprising aluminum and antimony chlorides are:

Catalyst compositions: 84–98% w. $SbCl_3$, 16–2% w. $AlCl_3$
Temperature: 180–200° F.
Pressure: 250–350 p.s.i.g.
Promoter concentration: 4–6% wt. HCl basis hydrocarbon feed Typical regenerator conditions are:

Temperature: 350–400° F.
Pressure: 1000 p.s.i.g. hydrogen+HCl
Promoter concentration: 60–100 p.s.i.g. HCl Although the mechanism of corrosion protection by aluminum metal in these systems is not completely understood, it is believed that success is dependent on the ability of the system to deposit an adherent coating of elemental antimony on the vessel walls. This explains in part the essential nature of antimony in the system. It is thought that in the absence of added aluminum, antimony chloride ($SbCl_3$) is reduced to monovalent antimony (Sb(I)) at the vessel wall, with, for example, elemental nickel being oxidized to Ni(II) and thereby going into solution.

When elemental aluminum is added to the system, the anodic half-reaction $Ni° \to Ni(II) + 2e^-$ is not affected. Elemental aluminum reduces antimony trichloride to monovalent antimony in substantial amounts according to the following reaction:

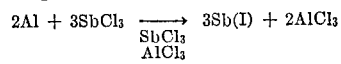

As a result of this reaction, there is a relatively large concentration of Sb(I) at the vessel wall. The conversion of aluminum metal to catalytically active aluminum chloride is also readily observed from this equation. The Sb(I) is subsequently reduced to Sb° in local cells at the vessel wall by the over-all reaction

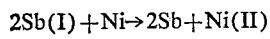

Elemental antimony plates out as a very resistant, adherent film on the nickel wall. This continuous, impervious film forms a physical barrier to the access of corrosive agent to the underlying alloy. The slow rate of dissolution of this film provides lasting protection of the surface.

This mechanism is substantiated by the fact that after a period of aluminum addition, a continuous, resistant film of antimony is found on the nickel walls, and yet substantially no solid, elemental antimony is found in the catalyst. This is surprising since it might be expected that elemental aluminum might substantially reduce $SbCl_3$ all the way to Sb°, resulting in the formation of solid antimony particles in the liquid system. The fact that Sb° is present only on the vessel walls indicates that the reduction reaction to Sb° takes place at the wall rather than in the solution. However, it seems likely that the $SbCl_3$ is at least partially reduced in the bulk of the solution, e.g., to Sb(I).

Among metals which may be successfully protected by aluminum addition are those wherein the major constituent is nickel. Preferred alloys contain at least 50% nickel. Especially preferred metals are substantially pure nickel and Inconel (nickel containing about 16% chromium and 8% iron). Ferrous metals, e.g., metals containing over 50% iron, are essentially unprotected by aluminum addition; apparently this is attributable to the inability of antimony to form a non-porous protective film on ferrous metals.

Several laboratory and pilot plant experiments were carried out to illustrate advantages of the invention. The results should not be construed to limit the invention, which is predicated on the discovery that the addition of elemental aluminum to systems containing aluminum and antimony halides reduces the corrosion of nickel and nickel alloys.

EXAMPLE I

Experiments were conducted to illustrate the effect of time and temperature on corrosion by $AlCl_3$/$SbCl_3$ catalysts. In these experiments, ½" x 2" nickel and Inconel specimens were sealed in glass ampoules with 20 ml. of a mixture of 20% $AlCl_3$/80% $SbCl_3$ saturated with HCl. The corrosion rates were determined at various temperatures and are reproduced below.

TABLE I.—CORROSION OF NICKEL AND INCONEL IN THE PRESENCE OF $AlCl_3$/$SbCl_3$/HCl

| Temperature, °C. | Corrosion Rates, mills/yr. | | | | | |
|---|---|---|---|---|---|---|
| | Nickel | | | Inconel | | |
| | 185 | 200 | 240 | 185 | 200 | 240 |
| Time: | | | | | | |
| 5 hours | | 102 | | | | |
| 1 day | 21 | 49 | 122 | 26 (500) | 10 | 30 |
| 2 days | 21 | | | 16 | | |
| 3 days | | 32 | 61 (100) | 7 | 11 | 33 |
| 4 days | 17 (90) | 24 | | | | |
| 7 days | | 17 | 34 | 6 | 8 | 43 |
| 10 days | | 15 | | | | |

Figures in parentheses represent estimated pitting rates, mils/yr.

Similar experiments were performed at 240° C. for nickel, Inconel, and carbon steel in the presence of varying concentrations of aluminum powder. Test duration was 3 days. The results are tabulated in Table II.

TABLE II.—REDUCTION OF CORROSION BY ALUMINUM ADDITION

| Metal | Aluminum Concentration, percent wt. of catalyst | Temperature, °C. | Corrosion Rate, mils/yr. |
|---|---|---|---|
| Nickel | 1.0 | 240 | 15 |
| | 0.1 | 240 | 26 |
| | 0.01 | 240 | 40 |
| | 0 | 240 | 61(100) |
| Inconel | 1.0 | 240 | 11 |
| | 0.1 | 240 | 6 |
| | 0.01 | 240 | 12 |
| | 0 | 240 | 33 |
| Carbon Steel | 1.0 | 240 | 125 |
| | 0.1 | 240 | 216 |
| | 0.01 | 240 | 225 |

Thus it is apparent that the addition of small amounts of aluminum reduces corrosion of nickel and Inconel by well over one-half; carbon steel still corrodes rapidly even in the presence of substantial amounts of aluminum at 240° C.

EXAMPLE II

To illustrate the selective protective effect of aluminum for high-nickel alloys, ¼" x 2" specimens of nickel, carbon steel, and a low-nickel steel were each placed in ampoules containing 20 ml. of a 20% $AlCl_3$–80% $SbCl_3$ mixture saturated with HCl. These ampoules and corresponding ampoules containing 0.1% powdered aluminum were maintained at 200° C. for one day. Corrosion results are tabulated below.

TABLE III

| Metal | Corrosion Rate, mils/yr. | |
|---|---|---|
| | Without Al Addition | With 0.1% wt. Al |
| Nickel | 49 | 14 |
| Carbon Steel | >306 | 314 |
| Nickel Steel (3.5% Ni) | 1,580 | 1,250 |

From these results, it is clear that the addition of aluminum powder causes substantial (i.e., four-fold) reduction of corrosion of nickel, but has relatively little effect on carbon steel or nickel steel. The ineffectiveness of the present protective method for ferrous metals is believed to be due to the inability of antimony to effectively form a uniform protective coating on ferrous metals.

EXAMPLE III

Corrosion tests were conducted in a pilot plant for regenerating spent AlCl₃ catalyst. The regenerator reactor was a 22-foot vertical column of 4" diameter fabricated of Hastelloy B (60% Ni, 30% Mo, 6% Fe). The column was unpacked except for a 4-foot section packed with ¾" ceramic Raschig rings below the catalyst sludge inlet near the top of the column. Hydrogen and hydrogen chloride gases were fed to the column at a point about 3 feet above the bottom of the column. Sludge and SbCl₃ (about 1 part by weight SbCl₃ per part sludge) flowed downward through the column, which was maintained at 300–425° F. and about 1000 p.s.i.g.; a mixture of SbCl₃ and regenerated AlCl₃ accumulated in the bottom of the column. Hydrogen, hydrogen chloride, and hydrocarbons were removed at the top of the column.

Nickel, Inconel, and carbon steel specimens (¾" x 3") were placed above and below the H₂/HCl inlet. Specimens below the inlet were submerged in the liquid in the column bottom. Results of several runs are tabulated in Table IV below.

TABLE IV.—REGENERATOR CORROSION RATES

| Run No | 1 | 2 | 3 | | 4 | | 5 | | 6 | |
|---|---|---|---|---|---|---|---|---|---|---|
| Operating Conditions: | | | | | | | | | | |
| Exposure, days | 17 | 8 | 10 | | | | 12.8 | | 12.8 | |
| Operating Time, days | 7.7 | 7.9 | 8.3 | | 9.5 | | 12.8 | | 7.7 | |
| Temperature, °F | 400 | 300 | 350 | | 300 | | 350 | | 350 | |
| Pressure, p.s.i.g | 1,000 | 1,000 | 1,000 | | 500–1,000 | | 1,000 | | 1,000 | |
| Powdered Al Addition | None | None | None | | None | | None | | None | |
| Location of Specimens Relative to H₂/HCl Inlet | Below | Below | Above | Below | Below | Above | Below | Above | Below |
| Corrosion Rate, mils/yr.: | | | | | | | | | | |
| Nickel | 200 | 13, 109 | 8 | 50 | 27 | | | 65 | 147 |
| Nickel (welded) | | 103, 108 | 8 | | 38 | | | 60 | 166 |
| Inconel | | 42 | (¹) | 70 | ² 17 | ³ 35, 63 | ⁴ 44, 55 | 91 | 126 |
| Inconel (welded) | | | (¹) | | ² 25 | ³ 45 | ³ 35 | 28 | 72 |
| Carbon steel | | 198 | | | | | | | |
| Nickel steel (3½%) | | | | | | | | | |

| Run No | 7 | 8 | | 9 | | 10 | 11 | 12 | |
|---|---|---|---|---|---|---|---|---|---|
| Operating Conditions: | | | | | | | | | |
| Exposure, days | | 6.4 | | 10.2 | | 8.1 | 49.5 | 5.7 | |
| Operating Time, days | 8.1 | | | interrupted | | interrupted | 8.2 | 4.5 | |
| Temperature, °F | 350 | 350 | | 400+ | | 400 | 350 | 350 | |
| Pressure, p.s.i.g | 1,000 | | | | | | 1,000 | 1,000 | |
| Powdered Al Addition | None | 32 lbs+10 lbs/day (about 0.1% wt.) | | 10 lbs/day | | 10 lbs/day | 10 lbs/day | 10 lbs/day | |
| Location of Specimens Relative to H₂/HCl Inlet | Below | Above | Below | Above | Below | Below | Below | Above | Below |
| Corrosion Rate, mils/yr.: | | | | | | | | | |
| Nickel | 49 | 4 | 7 | 7 | 10 | 13 | 8 | 3 | 1 |
| Nickel (welded) | 47 | | | | | | | | |
| Inconel | ⁴ 3 | 4 | 4 | | 2 | 2 | 8 | 4 | 3 |
| Inconel (welded) | ⁴ 1 | | | | | | | | |
| Carbon steel | | 209 | 500 | 207 | 310 | 740 | 261 | | 161 |
| Nickel steel (3½%) | | | | 55 | 168 | 436 | 100 | | 12 |

¹ Pitting, <45 mils/year.  ² Maximum pitting 120 mils/year.  ³ Coupled to aluminum.  ⁴ Low results believed due to residual aluminum in system.

The important reduction of corrosion inhibition attributed to aluminum addition is readily apparent from a comparison of runs 1–7 (without aluminum) with runs 8–12 (with aluminum addition). Corrosion rates of both nickel and Inconel are very high in the absence of aluminum, in all cases being well above any commercially practical level (e.g., less than 10 mils/yr.). When aluminum is added, however, corrosion rates are sharply reduced to satisfactorily low values. It is also noteworthy that neither nickel steel nor carbon steel is substantially affected by aluminum addition, indicating the selectivity of this method for surface of high nickel content.

The present method of corrosion protection is applicable to any system comprising both aluminum and antimony halides. Preferred halides for most processes are chloride, bromine, and iodine; especially preferred is chlorine. A particularly advantageous application is in the isomerization of C₄–C₆ paraffins with a molten aluminum chloride-antimony chloride catalyst. Most catalysts contain about 2–30% AlCl₃ and 98–70% SbCl₃; however, the method is also applicable to a process wherein an AlCl₃/hydrocarbon complex is used as long as SbCl₃ is present to the extent of at least 0.5% wt., preferably 5% wt. of the catalyst.

We claim as our invention:

1. A method of reducing corrosion of a metal containing nickel as the major constituent where the metal is in contact with a liquid catalyst comprising aluminum halide, antimony halide and hydrogen halide which comprises adding a corrosion-inhibiting amount of metallic aluminum to the liquid.

2. A method of reducing corrosion of a metal containing at least 50% nickel where the metal is in contact with a liquid catalyst comprising aluminum halide, antimony halide and hydrogen halide which comprises adding a corrosion-inhibiting amount of metallic aluminum to the liquid.

3. The method of claim 2 wherein each of said halides is chloride.

4. A method of reducing corrosion of a metal containing at least 50% nickel where the metal is in contact with a liquid catalyst comprising aluminum halide, antimony halide and hydrogen halide which comprises adding from about 0.005% to about 2% by weight, calculated on the basis of total aluminum and antimony halides, of metallic aluminum to the liquid.

5. The method of claim 4 wherein the metal is selected from the group consisting of nickel and Inconel.

6. The method of claim 5 wherein each of said halides is chloride.

References Cited

UNITED STATES PATENTS 2,265,870  12/1941  Schuit _____ 260—683.75
2,387,868  10/1945  Anderson et al. ___ 260—683.75
2,411,483  11/1946  Wachter et al. _____ 208—47
2,468,831   5/1949  Miller _____ 21—2.5 X MORRIS O. WOLK, *Primary Examiner.*

BARRY S. RICHMAN, *Assistant Examiner.*

U.S. Cl. X.R.

208—47; 260—683.75; 252—442